Patented Aug. 28, 1945

2,383,494

UNITED STATES PATENT OFFICE 2,383,494

MINERAL OIL COMPOSITION

Robert C. Moran, Wenonah, and Ronald E. Meyer, Ferdinand P. Otto, and Edward A. Oberright, Woodbury, N. J., assignors to Socony-Vacuum Oil Company, Incorporated, a corporation of New York No Drawing. Application June 23, 1943,
Serial No. 491,946

10 Claims. (Cl. 252—48)

This invention relates to the stabilization of petroleum products against the deleterious effects of oxidation and deterioration with use, and more specifically relates to the improvement or stabilization of mineral oil fractions, particularly viscous mineral oils, by the use of novel reaction products, or a novel class of reaction products, which when admixed with a mineral oil fraction in minor proportions will prevent or delay undesirable changes taking place in the oil.

It is well known to those familiar with the art that substantially all of the various fractions obtained from mineral oils and refined for their numerous uses are susceptible to oxidation. This susceptibility of an oil fraction to oxidation and the manner in which oxidation manifests itself within the oil varies with the type and degree of refinement to which the oil has been subjected and with the conditions under which the oil is used or tested. In other words, the deleterious products formed in an oil fraction as a result of oxidation and the degree to which they are formed depends upon the extent to which the various unstable constituents, which may act as oxidation catalysts, have been removed by refining operations and also upon the conditions of use.

This invention relates to phosphorus- and sulfur-containing reaction products which are capable of stabilizing mineral oil fractions, particularly viscous mineral oil fractions.

More specifically, the present invention is predicated upon the discovery of a new and novel class of oil improving agents which are designated herein as stable, non-corrosive, phosphorus- and sulfur-containing reaction products obtained by reacting substantially 1 mol of phosphorus pentasulfide ($P_2S_5$) with 4 mols of an unsaturated ketone at a temperature above about 100° C. Particularly preferred of such reaction products are those which are obtained with a reaction temperature between about 135° C. and about 200° C.

While all unsaturated ketones are contemplated for use herein, particularly preferred is dioleyl ketone which is also known in the art as diheptadecenyl ketone. Contemplated for use also is the technical grade of dioleyl ketone, commonly known as "oleone."

We have found that the character of the reaction products of this invention is influenced to a large degree by the reaction temperature. For example, when the aforesaid reaction of $P_2S_5$ and dioleyl ketone is carried out at a temperature between about 135° C. and about 150° C., the reaction products have a neutralization number (N. N.), which is a measure of its acidity, of about 60; whereas, when the reaction temperature is maintained at about 200° C. the neutralization number of the reaction products is much lower, in the neighborhood of 8 to 10. In short, a relatively high temperature 200° C. or more may be resorted to in order to provide slightly acidic, or even neutral, reaction products. The phosphorus and sulfur content of the reaction products obtained by varying the reaction temperature is not affected to this extent, inasmuch as such reaction products contain phosphorus and sulfur chemically combined in substantially the same molar ratio as in $P_2S_5$.

The oil improving reaction products of this invention are believed to be novel in that previous disclosures have shown that compounds containing sulfur, not phosphorus and sulfur, are formed in the reaction of $P_2S_5$ with certain ketones. More specifically, Spring, in the Bull. Soc. Chem. (France) 2, 40, 67, has disclosed that a dimer thioketone, $C_6H_{12}S_2$, is obtained when acetone is warmed with $P_2S_5$; and Gatterman in the Ber. 28, 2877, has disclosed that thiobenzophenone is obtained when benzophenone in benzene solution is heated with $P_2S_5$ for several hours at 130° C. in a bomb.

Although the reaction products of this invention are prepared substantially as indicated above, several modifications may be resorted to in order to obtain reaction products characterized by a particularly high degree of stability. In this regard we have found that the use of a non-oxidizing or inert gas, such that the reaction is carried out in a non-oxidizing atmosphere, makes for a reaction product of increased stability. Inert gases, such as nitrogen, carbon dioxide, etc., may be used for this purpose. Also as another modification, unreactive or substantially inert diluents such as acid treated kerosene, tetrachloroethane, etc., may be used during the reaction of an unsaturated ketone and $P_2S_5$, or may be admixed with the reaction product so formed, to aid in refining the product and may be removed thereafter by a suitable means, such as by distillation. A further modification involves the use of a mineral oil as the inert diluent in order to obtain a mineral oil blend or concentrate of the reaction product, The reaction products contemplated herein and the preparation thereof are illustrated by the following typical examples in which a particularly preferred ketone, oleone, is used. In these examples a reaction product prepared at a temperature of the order of 135° C. is described as a "relatively low temperature reaction product" and a reaction product prepared at a temperature in the range of 200° C. is referred to as a "relatively high temperature reaction product."

EXAMPLE ONE

Relatively High Temperature Reaction Product of Oleone and $P_2S_5$ (a) Reaction mixture

| | Grams |
|---|---|
| Oleone | 109 |
| $P_2S_5$ | 15.2 |
| Nitrogen gas. | |

(b) Procedure

One hundred and nine grams of oleone and 15.2 grams of $P_2S_5$ (a 4:1 ratio of oleone to $P_2S_5$) were charged to a reaction vessel equipped with a mechanically-driven stirrer, an upright Liebig condenser, a thermometer, and an inlet tube which extended to within a few inches above the reaction mixture. Nitrogen gas was continuously passed through the vessel to maintain a non-oxidizing atmosphere above the reaction mixture, which was constantly agitated. Heat was applied slowly until the temperature of the reaction mixture was about 200° C.; this temperature was maintained for 3 hours. The reaction mixture was cooled and diluted with a solvent naphtha and then filtered through "Hi-Flo." The solvent naphtha was removed from the filtrate by distillation under reduced pressure at a maximum temperature of 150° C. The reaction product so obtained is a light amber colored viscous oil containing 1.52 per cent phosphorus and 7.24 per cent sulfur and having a neutralization number (N. N.) of 4.1. This product will be referred to hereinafter as Product one.

A polished copper strip immersed in a 1 per cent blend of this reaction product in mineral oil and heated at 150° C. for 3 hours was not tarnished. The mineral oil blend was clear with no darkening of the oil and no sediment formation.

EXAMPLE TWO

Relatively Low Temperature Reaction Product of Oleone and $P_2S_5$ in Mineral Oil (a) Reaction mixture

| | Grams |
|---|---|
| Mineral oil | 200 |
| Oleone | 100 |
| $P_2S_5$ | 12 |
| Nitrogen gas. | |

(b) Procedure

One hundred grams of oleone, 12 grams of $P_2S_5$ (a 4:1 ratio of oleone to $P_2S_5$) and 200 grams of a mineral oil diluene (Saybolt Universal viscosity—S. U. V.—of 65 seconds at 210° F.) were charged to a reaction vessel equipped as described in Example one. The atmosphere above the mixture was constantly swept with nitrogen, which was introduced through the inlet tube, so as to maintain the mixture in a non-oxidizing atmosphere. The reaction mixture was stirred and heated at 135° C. for 3 hours. It was then filtered through "Hi-Flo" on a steam heated Buchner funnel to remove any deleterious by-products and unreacted $P_2S_5$. The reaction was considered complete when a polished copper strip immersed in a 3 per cent blend of the reaction product—that is, a 1 per cent blend of the concentrate—in mineral oil for 3 hours at 150° C. showed only a slight tarnish or discoloration. The reaction product in the mineral oil diluent is a light green-brown oil and contains 0.96 per cent phosphorus and 2.2 per cent sulfur, and has a neutralization number (N. N.) of 20.0. This reaction product is identified hereinafter as Product two.

EXAMPLE THREE

Relatively High Temperature Reaction Product of Oleone and $P_2S_5$ in Mineral Oil (a) Reaction mixture

| | Grams |
|---|---|
| Oleone | 75 |
| $P_2S_5$ | 10.5 |
| Mineral oil | 75 |
| Nitrogen gas. | |

(b) Procedure

The apparatus described in Example one was used in this preparation and the procedure of Example one was followed with the exception that the reaction mixture was slowly heated and held constant at that temperature for 3 hours. The reaction mixture in mineral oil is an amber colored oil and contains 1.17 per cent phosphorus and 4.1 per cent sulfur, and has a neutralization number (N. N.) of only 4.5. This product is referred to hereinafter as Product three.

To demonstrate the effectiveness of the unsaturated ketone-$P_2S_5$ reaction products contemplated herein as mineral oil improving agents oil blends were prepared containing small quantities of the representative reaction products, and then the blends and the blank oil were subjected to various tests hereinafter described. It will readily be seen by inspection of the results of these tests that these reaction products are extremely effective in stabilizing mineral oils.

CORROSION INHIBITION

Motor oils especially those refined by certain solvent-extraction methods tend to oxidize when submitted to high temperatures and to form products corrosive to metal bearings. This corrosive action may be quite severe with certain bearings such as those having the corrosive susceptibility of cadmium-silver alloys; and may cause their failure within a comparatively short time. The following test was used to determine the corrosive action of motor oil on an automotive connecting rod bearing.

The oil used was a Pennsylvania solvent refined oil having a S. U. V. of 53 seconds at 210° F. The oil was tested by adding a section of a bearing containing a cadmium-silver alloy surface weighing about 6 grams and heating it to 175° C. for 22 hours while a stream of air was bubbled against the surface of the bearing. The loss in weight of the bearing during this treatment is a measure of the amount of corrosion that has taken place. A sample of the oil containing a stabilizing agent was run at the same time as a sample of the straight oil and the loss in weight of the bearing section in the inhibited oil can thus be compared directly with the loss of the section in the uninhibited oil. The results obtained in this test are set forth in Table one below:

TABLE ONE

| Addition agent | Per cent added | Bearing loss, milligrams | |
|---|---|---|---|
| | | Inhibited oil | Uninhibited oil |
| Product one | 0.25 | 0 | 34 |
| | 0.125 | 2 | 34 |
| Product two | 0.75 | 0 | 53 |
| | 0.375 | 0 | 53 |
| Product three | 0.50 | 0 | 34 |
| | 0.25 | 2 | 34 |

ACCELERATED UNDERWOOD OXIDATION TEST

This test is used to determine the corrosive nature of lubricating oils under simulated operating conditions. The apparatus used consists of a circulating arrangement whereby an oil at 325° F., under a pressure of 10 pounds per square inch, is sprayed against a standard cadmium-nickel bearing for a period of 5 hours. The amount of oil under constant circulation in the system is 1500 cc. In passing through the system the oil under test comes in contact with cast iron, steel, stainless steel, copper, and the aforesaid cadmium-nickel bearing, and is also exposed to aeration. The oil used in this test contains a small amount of an accelerator, namely, iron naphthenate (commercially referred to as Nuodex, 6 per cent $Fe_2O_3$) which greatly increases the rate of oxidation of the oil. The degree of oxidation suffered by the oil is shown by the development of acidity therein as measured by the neutralization number (N. N.) and the loss in weight in grams of the cadmium-nickel bearing, and the percentage of viscosity increase.

The specific base oil used in this test was a solvent refined oil having a S. U. V. of 65 seconds at 210° F. and containing 0.17 per cent Nuodex; and the oil blend under test contained a small amount of Product two in this base oil. The results of these tests are shown in Table two below:

TABLE TWO

| Addition agent | Per cent conc. | Initial N. N. | N. N. | Per cent vis. inc. | Bearing loss, grams |
|---|---|---|---|---|---|
| | | | After 5 hours | | |
| None | | 0.25 | 8.8 | 126 | 1.446 |
| Product two | 3.0 | 0.40 | 0.52 | 3.0 | 0.002 |
| | | | After 10 hours | | |
| None | | 0.25 | | | |
| Product two | 3.0 | 0.40 | 0.52 | 7.0 | 0.002 |
| | | | After 15 hours | | |
| None | | 0.25 | | | |
| Product two | 3.0 | 0.40 | 0.52 | 9.0 | 0.002 |

The unsaturated ketone-$P_2S_5$ reaction products contemplated herein may be used in mineral oil fractions in various amounts depending upon the character of the oil, the degree of improvement of the oil to be obtained, the conditions under which it is to be used, etc. In general, however, it appears that appreciable improvement may be effected with these reaction products in amounts as small as 0.05 per cent. While amounts of 5 per cent or more may be used in such oil fractions, substantial improvement is provided by amounts of from about 0.25 per cent to about 3.0 per cent.

It is to be understood that while we have described hereinabove certain typical procedures for making the oil addition agents of this invention and have referred to certain reaction products and mineral oils, the invention is not to be construed as limited to these specific features of the description. Thus, it is to be understood that the present invention includes variations of the procedures, which will be apparent to those skilled in the art, and other typical reaction products and petroleum products which come within the scope of the appended claims.

We claim:

1. An improved mineral oil composition comprising a viscous mineral oil having in admixture therewith a minor proportion, sufficient to stabilize said mineral oil against the deleterious effects of oxidation, of a stable, non-corrosive, phosphorus- and sulfur-containing reaction product obtained by reaction of substantially one mol of phosphorus pentasulfide and four mols of dioleyl ketone at a temperature between about 100° C. and about 200° C.

2. An improved mineral oil composition comprising a viscous mineral oil having in admixture therewith a minor proportion, sufficient to stabilize said mineral oil against the deleterious effects of oxidation, of a staple, non-corrosive, phosphorus- and sulfur-containing reaction product obtained by reaction of substantially one mol of phosphorus pentasulfide and four mols of dioleyl ketone at a temperature between about 135° C. and about 200° C.

3. An improved mineral oil composition comprising a viscous mineral oil having in admixture therewith a minor proportion, sufficient to stabilize said mineral oil against the deleterious effects of oxidation, of a stable, non-corrosive, phosphorus- and sulfur-containing reaction product obtained by reaction of substantially one mol of phosphorus pentasulfide and four mols of dioleyl ketone at a temperature between about 135° C. and about 200° C. in a non-oxidizing atmosphere and in the presence of a substantially inert diluent.

4. An improved mineral oil composition comprising a viscous mineral oil having in admixture therewith a minor proportion, sufficient to stabilize said mineral oil against the deleterious effects of oxidation, of a stable, non-corrosive, phosphorus- and sulfur-containing reaction product obtained by reacting substantially one mol of phosphorus pentasulfide with four mols of oleone at 200° C. in an atmosphere of nitrogen.

5. An improved mineral oil composition comprising a viscous mineral oil having in admixture therewith a minor proportion, sufficient to stabilize said mineral oil against the deleterious effects of oxidation, of a stable, non-corrosive, phosphorus- and sulfur-containing reaction product obtained by reacting substantially one mol of phosphorus pentasulfide with four mols of oleone at 135° C. in an atmosphere of nitrogen and in the presence of a substantially inert mineral oil diluent.

6. An improved mineral oil composition comprising a viscous mineral oil having in admixture therewith a minor proportion, sufficient to stabilize said mineral oil against the deleterious effects of oxidation, of a stable, non-corrosive, phosphorus- and sulfur-containing reaction product obtained by reacting substantially one mol of phosphorus pentasulfide with four mols of oleone at 200° C. in an atmosphere of nitrogen and in the presence of a substantially inert mineral oil diluent.

7. A mineral oil concentrate containing a minor proportion of a stable, non-corrosive, phosphorus- and sulfur-containing reaction product obtained by reaction of substantially one mol of phosphorus pentasulfide and four mols of dioleyl ketone at a temperature between about 100° C. and about 200° C. in the presence of a substantially inert mineral oil diluent.

8. An improved mineral oil composition comprising a viscous mineral oil having in admixture therewith a minor proportion, from about 0.25 per cent to about 3.0 per cent, of a stable, non-corrosive, phosphorus- and sulfur-containing reaction product obtained by reaction of substantially one mol of phosphorus pentasulfide and four mols of dioleyl ketone at a temperature between about 100° C. and about 200° C.

9. An improved mineral oil composition comprising a viscous mineral oil having in admixture therewith a minor proportion, sufficient to stabilize said mineral oil against the deleterious effects of oxidation, of a stable, non-corrosive, phosphorus- and sulfur-containing reaction product obtained by reaction of substantially one mol of phosphorus pentasulfide and four mols of a symmetrical, long chain, unsaturated aliphatic ketone at a temperature between about 100° C. and about 200° C.

10. A mineral oil concentrate containing a minor proportion of a stable, non-corrosive, phosphorus- and sulfur-containing reaction product obtained by reaction of substantially one mol of phosphorus pentasulfide and four mols of a symmetrical, long chain, unsaturated aliphatic ketone at a temperature between about 100° C. and about 200° C. in the presence of a substantially inert mineral oil diluent.

ROBERT C. MORAN.
RONALD E. MEYER.
FERDINAND P. OTTO.
EDWARD A. OBERRIGHT.